United States Patent [19]
Guzay, Jr.

[11] Patent Number: 4,506,430
[45] Date of Patent: Mar. 26, 1985

[54] ELASTIC COVER APPLICATOR AND METHOD OF APPLYING COVER

[75] Inventor: Casimir M. Guzay, Jr., Hoffman Estates, Ill.

[73] Assignee: Panduit Corp., Tinley Park, Ill.

[21] Appl. No.: 534,001

[22] Filed: Sep. 19, 1983

[51] Int. Cl.³ .................. B23P 11/02; B23P 19/02
[52] U.S. Cl. .................................. 29/450; 29/235
[58] Field of Search .................. 29/255, 235, 450; 174/135, 127

[56] References Cited

U.S. PATENT DOCUMENTS

| | | | |
|---|---|---|---|
| 2,725,621 | 12/1955 | Gates | 29/413 |
| 2,803,056 | 8/1957 | Brissey, Jr. | 29/450 |
| 2,844,146 | 7/1958 | Perdue | 29/235 |
| 3,297,819 | 1/1967 | Wetmore | 174/127 |
| 3,515,798 | 6/1970 | Sievert | 174/135 |
| 3,824,331 | 7/1974 | Mixon, Jr. | 174/135 |
| 3,878,320 | 4/1975 | Mixon, Jr. | 174/135 |
| 3,992,570 | 11/1976 | Beinhaur | 174/135 |
| 4,068,364 | 1/1978 | Tharp et al. | 29/235 |
| 4,185,375 | 1/1980 | Brown | 29/450 |
| 4,291,454 | 9/1981 | Sawaryn | 29/235 |
| 4,389,440 | 6/1983 | Keith | 428/36 |

Primary Examiner—Howard N. Goldberg
Assistant Examiner—Steven Nichols
Attorney, Agent, or Firm—Charles R. Wentzel; Mark D. Hilliard

[57] ABSTRACT

An elastic cover applicator includes a folded elastic sleeve having an inner sleeve portion and a coaxially disposed outer sleeve portion overlaying the inner sleeve portion, the sleeve portions being continuously joined at an annular edge. A sleeve support holds the radially expanded sleeve in a radially stretched condition. A lubricating substance is applied between the inner and outer sleeve portions to separate and lubricate. After the applicator is coaxially disposed relative to the elongate object, a longitudinally directed force applied to the outer sleeve portion results in relative longitudinal movement between the outer sleeve portion and inner sleeve portion, removing the elastic cover from the support and applying it to the elongate object.

23 Claims, 11 Drawing Figures

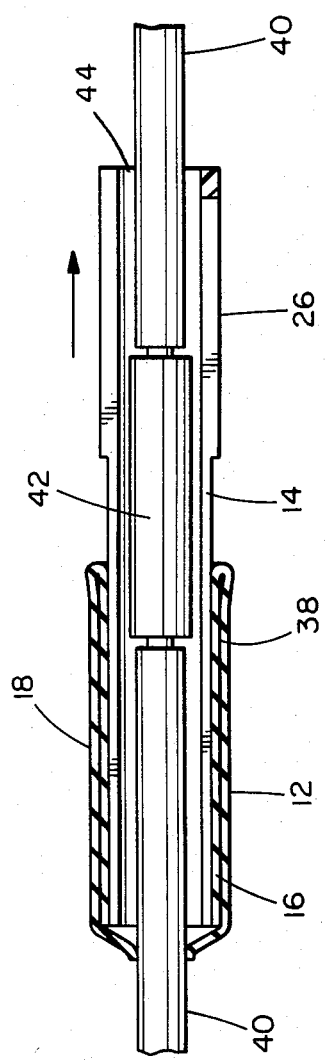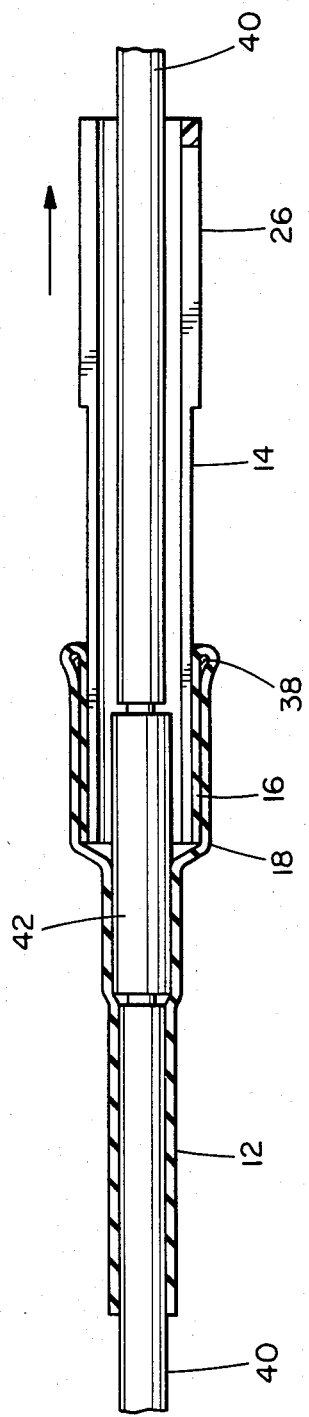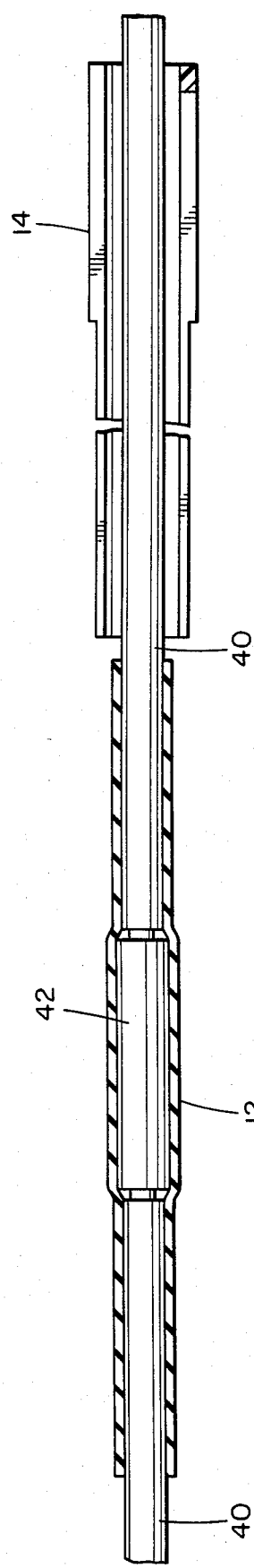

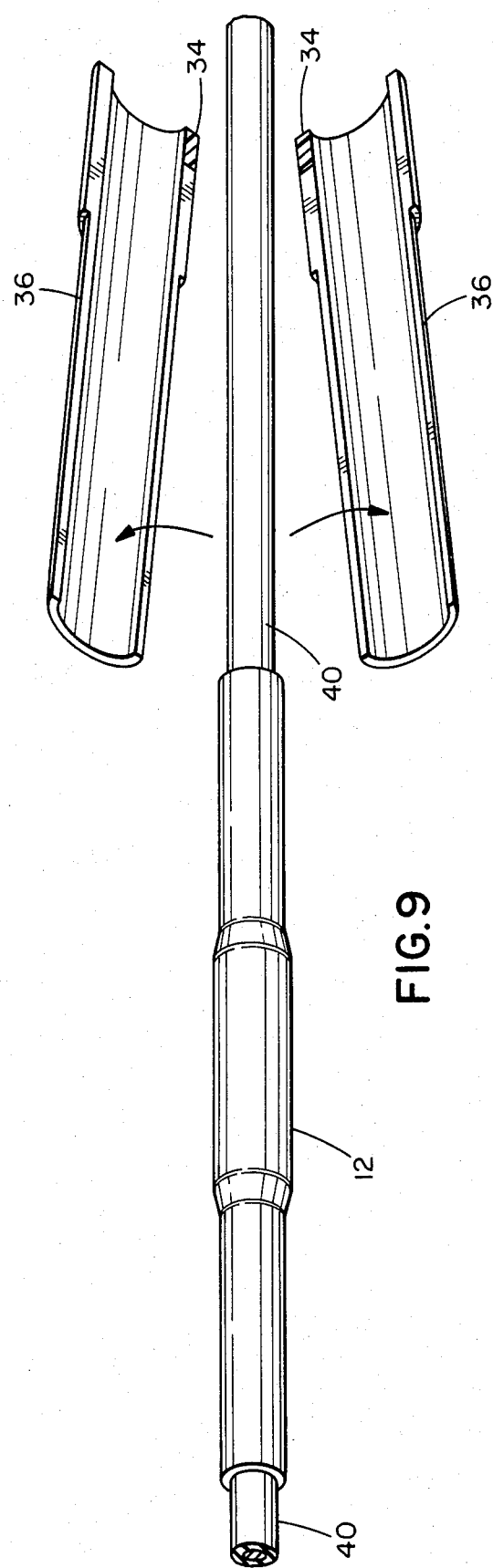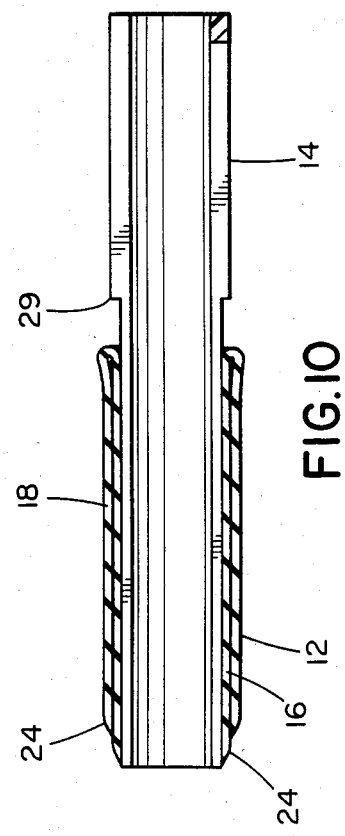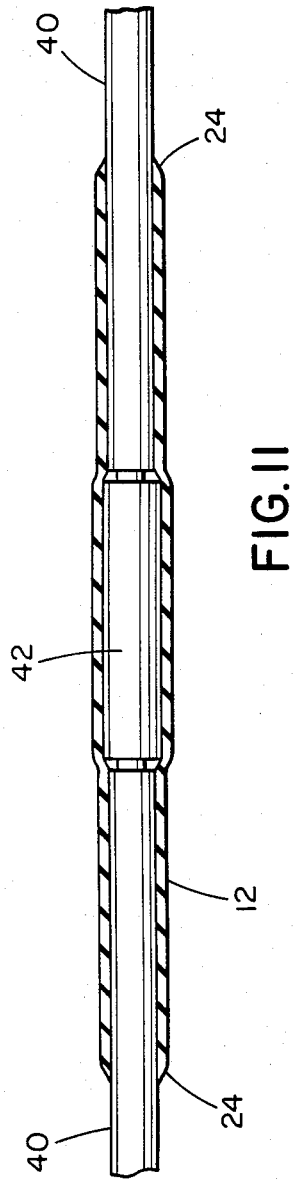
FIG. 9
FIG. 10
FIG. 11

ELASTIC COVER APPLICATOR AND METHOD OF APPLYING COVER

1. Technical Field

The present invention relates generally to the repair of discontinuities in the sheaths of wire cables or the like and more specifically to a cold shrink elastic cover applicator for applying a tubular elastic cover to seal and cover a wire cable splice area.

2. Background Art

Proposed solutions to the problem of how to apply an elastic sleeve to cover, seal and secure a wire cable splice area have been varied and often complex and cumbersome.

One proposed solution utilizes a sleeve formed of a heat contractable material which presents a medially positioned opening to receive a liquid sealing material This proposed solution not only requires the provision of a special heat contractable material, but requires the provision of a heat source during the application of the sleeve which is inconvenient and in some environments is dangerous. Reference may be made to U.S. Pat. No. 4,129,932.

Other proposed solutions utilize various methods to fix an expanded elastic sleeve within an outer shell in a radially stretched position and allow selective release of the expanded sleeve over the cable splice area. These proposed solutions are either characterized by complex multiple part mechanical applicators requiring the application and prolonged retention of differential air pressure, or are characterized by the use of special chemical solvents to release a radially stretched elastic sleeve that is bonded to an outer support shell. Reference may be made to the following patents: U.S. Pat. No. 3,138,859; U.S. Pat. No.4,267,628; U.S. Pat. No. 4,391,661; and U.S. Pat. No. 4,135,553.

Another proposed solution involves the provision of a multiple part support member upon which is positioned the rolled-up opposing ends of an elastic sleeve. Reference may be made to U.S. Pat. Nos. 3,824,331 and 3,878,320. Also see U.S. Pat. No. 3,274,330 proposing a similar rolled elastic sleeve in combination with a crimpable interior support cylinder Another proposed solution utilizes a specially constructed one-piece rigid spiral core having interconnected but separable adjacent coils to support an elastic radially stretched sleeve. Application of the spiral core requires careful withdrawal of the distal end of the spiral through the cylindrical space defined by the cable and the uncollapsed core. If the sleeve is misaligned with the cable or the spiral is withdrawn too quickly, the spiral can jam and fracture before the spiral is completely removed, resulting in a misapplied sleeve. Also, the spiral core can easily become prematurely separated during preapplication handling, resulting in a scraped part. Reference may be made to U.S. Pat. Nos. 3,515,798 and 4,389,440.

All of the above proposed solutions are marked by inherent complexity and/or inconvenience either in the manufacture or assembly of the elastic sleeve supporting member or in the process steps required during assembly and/or application of the elastic sleeve.

DISCLOSURE OF THE INVENTION

Among the several objects of the proposed invention may be noted, the provision of an improved applicator for applying elastic covers to elongate objects; the provision of such an applicator that is inherently simple to manufacture and apply; the provision of such an applicator that will securely and sealingly apply an elastic sleeve to cover a wire splice area; the provision of such an applicator that can be manufactured having a substance that enhances the characteristics of the splice contained within the unused applicator, and the provision of such an applicator having a simply constructed and easily removable inner support member.

These and other objects, together with the advantages thereof over existing prior art forms, which will become apparent from the following specification, are accomplished by means hereinafter described.

In general, an applicator for applying an elastic cover to an elongate object includes a folded elastic sleeve having an inner sleeve portion and coaxially disposed outer sleeve portion overlaying the inner sleeve portion, the sleeve portions being continuously joined at an annular edge. A sleeve support holds the radially expanded sleeve in a radially stretched condition. The sleeve support is hollow to allow coaxial positioning of the applicator relative to a cable or the like. A lubricating substance is applied between the inner adjacent surfaces of the inner and outer sleeve portions to separate the adjacent surfaces and to reduce the frictional interference between the adjacent surfaces.

BRIEF DESCRIPTION OF THE DRAWINGS

FIG. 6 is a sectional view of the applicator of FIG. 1 showing an initial position of the elastic sleeve as it is applied.

FIG. 7 is a sectional view of the applicator of FIG. 1 showing an intermediate position of the sleeve as it is applied.

FIG. 8 is a sectional view of the applicator of FIG. 1 showing an applied sleeve.

FIG. 9 is a perspective view of the applicator of FIG. 1 showing the removal of the support tube.

FIG. 10 is a sectional view of another applicator embodying the concept of the present invention, the elastic sleeve of the applicator having beveled distal edges.

FIG. 11 is a sectional view of the applied sleeve of the applicator of FIG. 10.

PREFERRED EMBODIMENT FOR CARRYING OUT THE INVENTION

Figure 3:
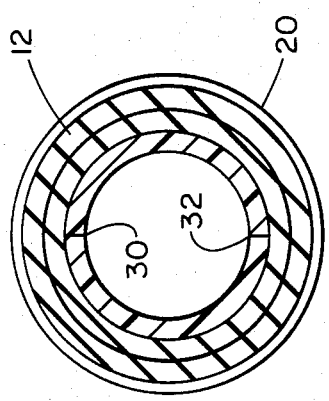
FIG. 3 is a sectional view taken along line 3—3 of FIG. 2 of the applicator of FIG. 1.
Figure 4:
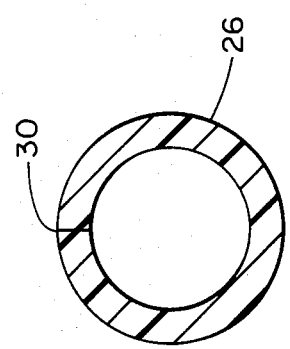
FIG. 4 is a sectional view taken long line 4—4 of FIG. 2 of the supporting core handle portion of the applicator of FIG. 1.

An applicator embodying the concept of the present invention is designated generally by a numeral 10 in the accompanying drawings Applicator 10 includes a folded elastic sleeve 12 and a support tube 14. Sleeve 12 has an inner sleeve portion 16 and an outer sleeve portion 18 overlaying inner sleeve portion 16. Inner and outer sleeve portions 16 and 18 are continuously joined at an annular edge 20.

In preferred form, sleeve 12 is formed of an ethylene propylene terpolymer having an A.S.T.M. D1418 designation of "EPDM". It being understood that many different synthetic and natural rubber compounds may be utilized to practice the present invention; the selection of which would depend not only upon the desired enhancement of properties conducive to the application of the sleeve, properties such as excellent elasticity, elastic memory and tear resistance, but would depend also upon properties needed for proper functioning of the wire splice, such as adhesive or lubricant compatability, abrasion resistance, flame retardance and electrical resistivity.

Sleeve 12 is mounted on support tube 14 in a radially stretched condition. Sleeve 12 in one embodiment in its relaxed state has an inner diameter of 0.375 inches and a wall thickness of 150 inches. After radial expansion and folding of sleeve 12, sleeve 12 presents the following approximate dimensions: inner diameter of inner sleeve portion 16 is 1.125 inches; the wall thickness of inner sleeve portion 16 is 0.075 inches; inner diameter of outer sleeve portion 18 is 1.275 inches; and the wall thickness of outer sleeve portion is 0.055 inches. Thus the average diameter of sleeve 12 is increased approximately two and one half to three times. The embodiment of sleeve 12 shown in FIG. 1 having the above defined dimensions can form an effective splice with a sheathed conductor having an outer diameter within the range of 0.44 inches to 0.93 inches. In preferred form, folded sleeve 12 is approximately 5 inches in length.

Figure 1:
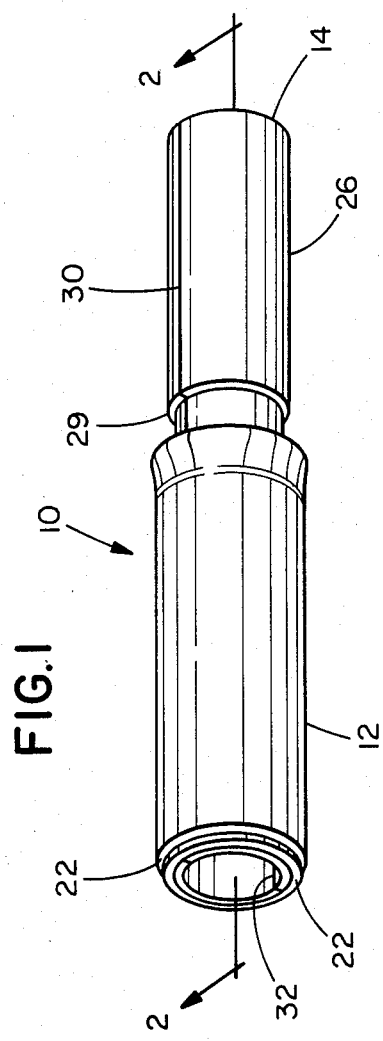
FIG. 1 is a perspective view of an applicator for applying an elastic sleeve to an elongate object embodying the concept of the present invention.

As seen in FIG. 1, sleeve 12 consists of a tube having edges 22 each of which is located in a plane normal to the longitudinal axis of sleeve 12. A proposed alternate embodiment is shown in FIGS. 10 and 11, the outer edges of the installed elastic sleeve being attenuated to form beveled edges 24. Beveled edges 24 provide a gradual transition from the covered elongate object to the applied sleeve 12 thus preventing interference between the edge of the applied sleeve 12 and its environment.

It should be noted that the hoop stress induced in the mounted elastic sleeve 12 by radially stretching sleeve 12 causes beveled edge 24 of sleeve 12 to seek the smallest possible diameter, that diameter being the outer diameter of support tube 14.

Beveled edge 24 on a mounted sleeve 12 will taper from the surface of support tube 14 to the outer diameter of elastic sleeve 12, whether or not the bevel is imparted to the inner surface of sleeve portion 12 or the outer surface of sleeve portion 12. Thus after sleeve 12 is folded and mounted on support tube 14, a bevel can be imparted to both edges 24 in one operation, for example, by slightly offsetting outer sleeve portion 18 inwardly and grinding both edges simultaneously with a conical cup shaped rotating abrasive wheel. After sleeve 12 is applied, the hoop stress of the stretched elastic sleeve will cause both edges 24 to taper from conductor 40 to the sleeve's outer diameter as seen in FIG. 11. In order to induce sufficient hoop stress in beveled edges 24 to ensure beveled edges 24 will draw down upon a sheathed conductor, the sheathed conductor should have an outer diameter in a range of 0.66 inches to 0.93 inches, when sleeve 12 is constructed having the above detailed dimensions.

Support tube 14 is a hollow cylindrical rigid thermoplastic tube approximately 8 inches in length having a longitudinal passage 44, a handle portion 26 and a sleeve mounting portion 28. Preferably handle portion 26 is of a larger diameter than sleeve mounting portion 28 to abuttingly limit the inward axial movement of outer sleeve portion 18 at abutment 29. As best seen in FIGS. 1 and 9, support tube 14 has a first longitudinal slit 30 extending along its length and an opposing second longitudinal slit 32 extending from the end of the support tube 14 adjacent sleeve 12 to a point remote from the opposite end of support tube 14. Second longitudinal slit 32 stops short of the opposite end to form a frangible hinge 34 that connects opposing sections 36 of support tube 14. Hinge 34, in preferred form, is approximately 0.25 inches long, a length which can vary depending upon the characteristics of the material forming the support tube 14.

Support tube 14 could also be constructed of two C-shaped discrete extruded thermoplastic opposing sections having easily separable interlocking longitudinal edges; the overlaying elastic sleeve 12 securing the two sections to form a support tube 14. In this form, the outside diameter of support tube 12 would be uniform across the length of support tube 12.

Figure 5:
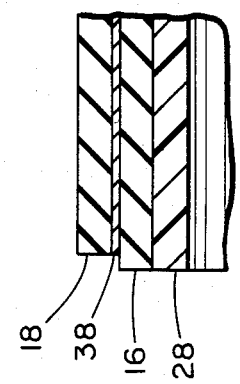
FIG. 5 is an enlarged sectional view of the area encircled in FIG. 2.
Figure 2:
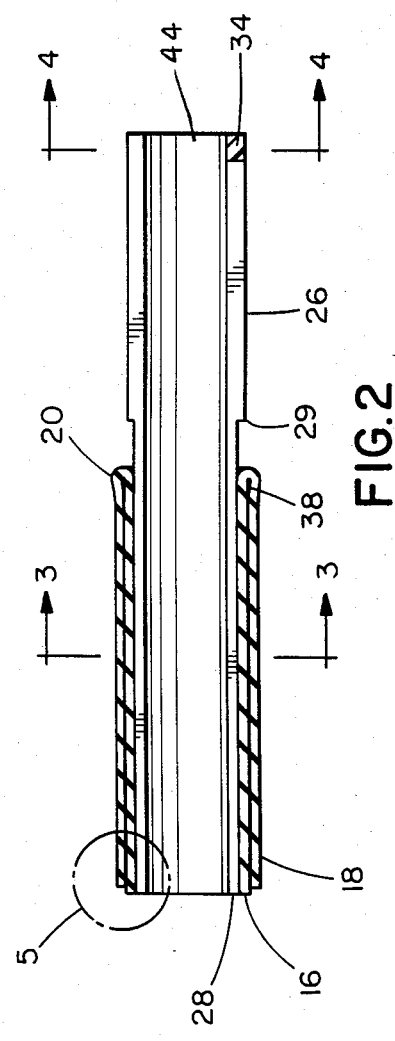
FIG. 2 is a sectional view taken along line 2—2 of FIG. 1 of the applicator of FIG. 1.

Referring now to FIGS. 2 and 5, a lubricating substance 38 is positioned between the inner adjacent surfaces of inner and outer sleeve portions 16 and 18. Substance 38 functions to separate and lubricate the inner adjacent surfaces of inner and outer sleeve portions 16 and 18.

In preferred form, substance 38 includes a liquid silicone grease or a liquid white lithium grease dispersed between the inner adjacent surfaces of inner and outer sleeve portions 16 and 18. The grease can be injected into the interior of the fold of sleeve 12 or applied to the surfaces of sleeve 12 before sleeve 12 is folded upon itself; the compressive forces induced in the radially expanded sleeve 12 effecting uniform dispersion of the grease. The grease should substantially coat the inner adjacent surfaces of inner and outer sleeve portions 16 and 18.

Another liquid substance that not only functions to separate and lubricate but also would enhance the bond between the applied elastic sleeve 12 and the elongate object to which it is applied would be either of the constituent liquid parts of a multiple part adhesive, such as the liquid resin or liquid hardening agent of common epoxy adhesives. One constituent part of the adhesive could be applied between inner and outer sleeve portions 16 and 18 while the other constituent part could be applied to the splice area of the cable. Installation of sleeve 12 would unite the two adhesive components and form an adhesive bond which would further enhance the elastic bond of sleeve 12.

Another lubricating substance that also functions to separate and lubricate inner and outer sleeve portions 16 and 18 is powdered graphite.

In order to explain the operation of applicator 10, attention is directed to FIGS. 6 through 9. Applicator 10 is illustrated being utilized to apply an elastomeric sleeve to two elongated sheathed conductors 40 that are joined by a metal wire splice connector 42.

Initially, applicator 10 is positioned coaxially with conductors 40. This coaxial positioning can be accomplished prior to connection of conductors 40 by inserting one conductor 40 through longitudinal passage 44, connecting conductors 40 with wire splice connector 42 and positioning applicator 10 over connector 42. The user then applies a longitudinally and outwardly directed force to outer sleeve portion 18 and applies an opposing longitudinally and outwardly directed force to handle portion 26 of support tube 14, causing relative longitudinal movement between outer sleeve portion 18 and inner sleeve portion 16. The outward movement of outer sleeve portion 18 beyond sleeve mounting portion 28 of support tube 14 causes the increment of the radially stretched outer sleeve portion 18 that is not supported by sleeve mounting portion 28 to naturally contract to a portion of its relaxed diameter and securely grasp sheathed conductor 40.

Continued movement of support tube 14 in the direction of the arrow in FIG. 7 progressively applies sleeve 12 to conductors 40 until sleeve 12 is completely installed, as seen in FIG. 8. After sleeve 12 is applied opposing sections 36 of support tube 14 are separated and, if necessary, frangible hinge 34 is fractured and the discrete sections 36 are removed from conductor 40, see FIG. 9.

As best shown in FIG. 7, as outer sleeve portion 18 is applied, its inner lubricated surface is wiped of a portion of lubricating substance 38. Since inner and outer sleeve portions 16 and 18 are decreasing in length and surface area as sleeve 12 is applied, lubricating substance 38 wiped from the applied section of sleeve 12 is contained within a progressively decreasing volume defined by the remaining inner and outer sleeve portions 16 and 18. As the volume containing the lubricating substance 38 decreases, the amount of separation between inner sleeve portion 16 and outer sleeve portion 18 increases and the longitudinal movement retarding frictional forces are reduced. Thus as sleeve 12 is applied, it takes progressively less force to produce relative movement of outer sleeve portion 18.

The lubricant enhancing movement of applicator 10 in combination with the significant forces developed due to the contraction of the distal portion of sleeve 12, results in an applicator that is virtually self-applying after the edge of outer sleeve portion 18 is forced past support tube 14.

I claim:

1. An applicator for applying an elastic cover to an elongate object, comprising:
    a folded elastic sleeve having an inner sleeve portion and a coaxially disposed outer sleeve portion overlaying said inner sleeve portion, said inner and outer sleeve portions being continuously joined at an annular edge;
    supporting means for supporting said folded elastic sleeve in a radially stretched condition, said supporting means having a longitudinal passage to interiorly accept the elongate object to be covered; and
    lubricating means for separating said inner sleeve portion from said outer sleeve portion, whereby a longitudinally directed force applied to said outer sleeve portion results in relative longitudinal movement between said outer sleeve portion and said inner sleeve portion, whereby said elastic sleeve may be removed from said supporting means.

2. An applicator as set forth in claim 1, wherein said supporting means is separable along its length allowing removal of said supporting means from the elongate object after application of said elastic sleeve.

3. An applicator as set forth in claim 2, wherein said supporting means includes a cylinder having a first longitudinal slit extending the length of said cylinder and a second longitudinal slit extending from the end of said support means adjacent said elastic sleeve to a point remote from the opposite end of said cylinder, said second slit stopping short of the opposite end of said cylinder to form a hinged portion connecting opposing sections of said cylinder.

4. An applicator as set forth in claim 1, wherein said lubricating means includes a liquid lubricant.

5. An applicator as set forth in claim 1, wherein said lubricating means includes a powdered lubricant.

6. An applicator as set forth in claim 1, wherein said lubricating means includes one part of a two-part adhesive.

7. An applicator as set forth in claim 3, wherein said lubricating means includes a liquid lubricant.

8. An applicator as set forth in claim 3, wherein said lubricating means includes a powdered lubricant.

9. An applicator as set forth in claim 3, wherein said lubricating means includes one part of a two-part adhesive.

10. An applicator as set forth in claim 2, wherein said elastic sleeve has beveled edges, whereby the hoop stress induced in said beveled edges by radially stretching said elastic sleeve causes said beveled edges to taper from the surface of the elongate object whether or not said beveled edges are formed on the interior or on the exterior of said elastic sleeve.

11. An applicator for applying an elastic cover to an elongate object, comprising:
    a folded elastic sleeve having an inner sleeve portion and a coaxially disposed outer sleeve portion overlaying said inner sleeve portion, said inner and outer sleeve portions being continuously joined at an annular edge;
    supporting means for supporting said folded elastic sleeve in a radially stretched condition, said supporting means having a longitudinal passage to interiorly accept the elongate object to be covered; and
    friction reducing means for reducing the coefficient of friction between said inner sleeve portion and said outer sleeve portion whereby a longitudinally directed force applied to said outer sleeve portion results in relative longitudinal movement between said outer sleeve portion and said inner sleeve portion and permits removal of said elastic sleeve from said supporting means onto said elongate object.

12. An applicator as set forth in claim 11, wherein said friction reducing means includes a liquid lubricant.

13. An applicator as set forth in claim 11, wherein said friction reducing means includes one part of a two-part adhesive.

14. An applicator as set forth in claim 11, wherein said friction reducing means includes a powdered lubricant.

15. An applicator as set forth in claim 11, wherein said supporting means is separable along its length allowing removal of said supporting means from the elongate object after application of said elastic sleeve.

16. An applicator as set forth in claim 15, wherein said supporting means includes a cylinder having a first longitudinal slit extending the length of said cylinder and a second longitudinal slit extending from the end of said support means adjacent said elastic sleeve to a point remote from the opposite end of said cylinder, said second slit stopping short of the opposite end of said cylinder to form a hinge portion connecting opposing sections of said cylinder.

17. An applicator as set forth in claim 16, wherein said friction reducing means includes a friction reducing liquid lubricant.

18. An applicator as set forth in claim 16, wherein said friction reducing means includes a powdered lubricant.

19. An applicator as set forth in claim 16, wherein said friction reducing means includes one part of a two-part adhesive.

20. An applicator as set forth in claim 15, wherein said elastic sleeve has beveled edges, whereby the hoop stress induced in said beveled edges by radially stretching said elastic sleeve causes said beveled edges to taper from the surface of the elongate object whether or not said beveled edges are formed on the interior or on the exterior of said elastic sleeve.

21. A method for applying a cover to an elongate object comprising the steps of:

positioning a folded elastic sleeve in a radially stretched condition upon a support having a longitudinal passage to interiorly accept the elongate object to be covered, the elastic sleeve having an inner sleeve portion and a coaxially disposed outer sleeve portion, the sleeve portions being continuously joined at an annular edge;

applying a separating and lubricating means between the inner sleeve portion and outer sleeve portion;

coaxially positioning the supporting means around the elongate object; and applying a longitudinal force to the outer sleeve portion effecting longitudinal movement in the outer sleeve portion relative to the inner sleeve portion whereby the outer sleeve portion is moved beyond the supporting means and progressively is applied to the elongate object to be covered.

22. A method as set forth in claim 21, wherein the separating and lubricating means includes a liquid lubricant.

23. A method as set forth in claim 22, wherein the support is separable along its length allowing removal of the support means from the elongate object after application of the elastic sleeve; and including the additional step of removing the support from the elongate object after application of the elastic sleeve.

* * * * *